(12) United States Patent
Dotson et al.

(10) Patent No.: US 7,129,323 B2
(45) Date of Patent: *Oct. 31, 2006

(54) BIMOLECULAR NUCLEATION METHODS FOR THERMOPLASTICS

(75) Inventors: Darin L. Dotson, Spartanburg, SC (US); Nathan A. Mehl, Moore, SC (US); Brian M. Burkhart, Greenville, SC (US); Jiannong Xu, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 484 days.

This patent is subject to a terminal disclaimer.

(21) Appl. No.: 10/172,338

(22) Filed: Jun. 14, 2002

(65) Prior Publication Data

US 2003/0236332 A1  Dec. 25, 2003

(51) Int. Cl.
  *C08K 5/098* (2006.01)
  *C08K 3/22* (2006.01)
(52) U.S. Cl. .................. 528/486; 528/488; 528/503; 524/285; 524/394; 524/396
(58) Field of Classification Search ............... 528/486, 528/488, 503; 524/285, 394, 396
See application file for complete search history.

(56) References Cited

U.S. PATENT DOCUMENTS

| | | | |
|---|---|---|---|
| 3,207,735 A | 9/1965 | Wijga | 260/93.7 |
| 3,207,736 A | 9/1965 | Wijga | 260/93.7 |
| 3,207,737 A | 9/1965 | Wales | 260/93.7 |
| 3,207,738 A | 9/1965 | Wijga | 260/93.7 |
| 3,207,739 A | 9/1965 | Wales | 260/93.7 |
| 4,016,118 A | 4/1977 | Hamada et al. | 260/17.4 |
| 4,314,039 A | 2/1982 | Kawai et al. | 525/1 |
| 4,371,645 A | 2/1983 | Mahaffey, Jr. | 524/108 |
| 4,463,113 A | 7/1984 | Nakahara et al. | 524/117 |
| 4,532,280 A | 7/1985 | Kobayashi et al. | 524/108 |
| 5,049,605 A | 9/1991 | Rekers | 524/108 |
| 5,231,126 A | 7/1993 | Shi et al. | 524/296 |
| 5,300,549 A | 4/1994 | Ward et al. | 524/321 |
| 5,319,012 A | 6/1994 | Ward et al. | 524/321 |
| 5,342,868 A | 8/1994 | Kimura et al. | 524/108 |
| 6,562,890 B1 * | 5/2003 | Dotson | 524/396 |
| 6,703,434 B1 * | 3/2004 | Dotson | 524/108 |
| 2004/0132884 A1* | 7/2004 | Dotson et al. | 524/394 |

FOREIGN PATENT DOCUMENTS

WO  WO 98/29494  * 7/1998

* cited by examiner

*Primary Examiner*—Tae H. Yoon
(74) *Attorney, Agent, or Firm*—Terry T. Moyer; John E. Vick, Jr.

(57) ABSTRACT

Specific methods of inducing high nucleation rates in thermoplastics, such as polyolefins, and particularly, though not necessarily, polypropylenes, through the introduction of two different compounds that are substantially soluble within the target molten thermoplastic resin (such as, as one non-limiting example, an added compound including at least one acid group and an added organic salt) are provided. Such introduced components react to form a nucleating agent in situ within such a target molten thermoplastic resin which is then allowed to cool. Preferably, one compound is an acid, preferably bicyclic (i.e., two cyclic systems sharing at least three carbon atoms) or monocycloaliphatic (i.e., a single, saturated ring system) in nature, such as, without limitation, bicyclo[2.2.1]heptane dicarboxylic acid or hexahydrophthalic acid, and the other compound is an organic salt, such as a carboxylate, sulfonate, phosphate, oxalate, and the like, and more preferably selected from the group consisting of metal $C_8$–$C_{22}$ esters. Such a production method thus provides a manner of generating in Situ the desired nucleating agent through reaction of such soluble compounds. Kits (e.g., masterbatch methods, for example) comprising such components for easy introduction within target molten polyolefin resins are also contemplated within this invention.

3 Claims, No Drawings ns, and particularly, though not necessarily, polypropylenes,

BIMOLECULAR NUCLEATION METHODS FOR THERMOPLASTICS

FIELD OF THE INVENTION

This invention relates to specific methods of inducing high nucleation rates in thermoplastics, such as polyolefi through the introduction of two different compounds that are substantially soluble within the target molten thermoplastic resin (such as, as one non-limiting example, an added compound including at least one acid group and an added organic salt). Such introduced components react to form a nucleating agent in situ within such a target molten thermoplastic resin which is then allowed to cool. Preferably, one compound is an acid, preferably bicyclic (i.e., two cyclic systems sharing at least three carbon atoms) or monocycloaliphatic (i.e., a single, saturated ring system) in nature, such as, without limitation, bicyclo[2.2.1]heptane dicarboxylic acid or hexahydrophthalic acid, and the other compound is an organic salt, such as a carboxylate, sulfonate, phosphate, oxalate, and the like, and more preferably selected from the group consisting of metal $C_8$–$C_{22}$ esters. Such a production method thus provides a manner of generating in situ the desired nucleating agent through reaction of such soluble compounds. Kits (e.g., masterbatch methods, for example) comprising such components for easy introduction within target molten polyolefin resins are also contemplated within this invention.

BACKGROUND OF THE PRIOR ART

All U.S. patents cited below are herein entirely incorporated by reference.

As used herein, the term "thermoplastic" is intended to mean a polymeric material that will melt upon exposure to sufficient heat but will retain its solidified state, but not prior shape without use of a mold or like article, upon sufficient cooling. Specifically, as well, such a term is intended solely to encompass polymers meeting such a broad definition that also exhibit either crystalline or semi-crystalline morphology upon cooling after melt-formation through the use of the aforementioned mold or like article. Particular types of polymers contemplated within such a definition include, without limitation, polyolefins (such as polyethylene, polypropylene, polybutylene, and any combination thereof), polyamides (such as nylon), polyurethanes, polyester (such as polyethylene terephthalate), and the like (as well as any combinations thereof).

Thermoplastics have been utilized in a variety of end-use applications, including storage containers, medical devices, food packages, plastic tubes and pipes, shelving units, and the like. Such base compositions, however, must exhibit certain physical characteristics in order to permit widespread use. Specifically within polyolefins, for example, uniformity in arrangement of crystals upon crystallization is a necessity to provide an effective, durable, and versatile polyolefin article. In order to achieve such desirable physical properties, it has been known that certain compounds and compositions provide nucleation sites for polyolefin crystal growth during molding or fabrication. Generally, compositions containing such nucleating compounds crystallize at a much faster rate than un-nucleated polyolefin. Such crystallization at higher temperatures results in reduced fabrication cycle times and a variety of improvements in physical properties, such as, in one example, stiffness.

Such compounds and compositions that provide faster and or higher polymer crystallization temperatures are thus popularly known as nucleators. Such compounds are, as their name suggests, utilized to provide nucleation sites for crystal growth during cooling of a thermoplastic molten formulation. Generally, the presence of such nucleation sites results in a larger number of smaller crystals. As a result of the smaller crystals formed therein, clarification of the target thermoplastic may also be achieved, although excellent clarity is not always a result. The more uniform, and preferably smaller, the crystal size, the less light is scattered. In such a manner, the clarity of the thermoplastic article itself can be improved. Thus, thermoplastic nucleator compounds are very important to the thermoplastic industry in order to provide improved clarity, physical properties and/or faster processing.

Dibenzylidene sorbitol compounds are common nucleator compounds, particularly for polypropylene end products. Compounds such as 1,3-O-2,4-bis(3,4-dimethylbenzylidene) sorbitol (hereinafter DMDBS), available from Milliken Chemical under the trade name Millad® 3988, provide excellent nucleation characteristics for target polypropylenes and other polyolefins. Other well known compounds include sodium benzoate, sodium 2,2'-methylene-bis-(4,6-di-tert-butylphenyl) phosphate (from Asahi Denka Kogyo K.K., known as NA-11), talc, and the like.

Other acetals of sorbitol and xylitol are typical nucleators for polyolefins and other thermoplastics as well. Dibenzylidene sorbitol (DBS) was first disclosed in U.S. Pat. No. 4,016,118 by Hamada, et al. as an effective nucleating and clarifying agents for polyolefins. Since then, large number of acetals of sorbitol and xylitol have been disclosed. Representative US patents include: Kawai, et al., U.S. Pat. No. 4,314,039 on di(alkylbenzylidene) sorbitols; Mahaffey, Jr., U.S. Pat. No. 4,371,645 on di-acetals of sorbitol having at least one chlorine or bromine substituent; Kobayashi, et al., U.S. Pat. No. 4,532,280 on di(methyl or ethyl substituted benzylidene) sorbitol; Rekers, U.S. Pat. No. 5,049,605 on bis(3,4-dialkylbenzylidene) sorbitols including substituents forming a carbocyclic ring.

Other examples of effective nucleating agents are the metal salts of organic acids. Wijga in U.S. Pat. Nos. 3,207,735, 3,207,736, and 3,207,738, and Wales in U.S. Pat. Nos. 3,207,737 and 3,207,739, all patented Sep. 21, 1966, suggest that aliphatic, cycloaliphatic, and aromatic carboxylic, dicarboxylic or higher polycarboxylic acids, corresponding anhydrides and metal salts are effective nucleating agents for polyolefin. They further state that benzoic acid type compounds, in particular sodium benzoate, are the best embodiment of the nucleating agents.

Another class of nucleating agents, alluded to above, was suggested by Nakahara, et al. in U.S. Pat. No. 4,463,113, in which cyclic bis-phenol phosphates were disclosed as nucleating and clarifying agents for polyolefin resins. Kimura, et al. then suggests in U.S. Pat. No. 5,342,868 that the addition of an alkali metal carboxylate to basic polyvalent metal salt of cyclic organophosphoric ester can further improve the clarification effects of such additives. This patent thus at best discloses the reaction of a salt with a base, although such a reaction is never actually stated to occur within this reference. Compounds that are based upon these technologies are marketed under the trade name NA-11 and NA-21.

U.S. Pat. Nos. 5,300,549 and 5,319,012, as well as published PCT Application WO 01/53404 all disclose the addition of metal salts to acidic catalyst residues (i.e., aluminum catalyst by-products having low pH levels, but no acid functionalities, such as carboxyl groups, thereon)

already present within a target resin as a means to provide nucleation and clarity to thermoplastics. None of these patents discloses the ability to introduce separately to molten resins different soluble compounds therein to generate a bicyclic or monocycloaliphatic nucleating agent in situ.

U.S. Pat. No. 5,231,126 teaches beta-nucleation of polypropylene through the reaction of linear aliphatic or aromatic acids with oxides, hydroxides, or salts within target polypropylene. Such a method requires specific types of dibasic acids to accomplish the desired beta-polypropylene crystal generation at sufficiently high levels. Generally, however, the production of such high levels of beta-crystals is unwanted and thus such beta-nucleation of target polypropylene is to be avoided. In fact, in order to provide the best clarity in target polypropylene, the amount of beta-crystals should be at most 5% of the total amount of polypropylene crystals within the target plastic itself, with the closer to 0% beta-crystals the better for the best level of low haze (and thus a non-opaque result).

Furthermore, a certain class of bicyclic compounds, such as bicyclic dicarboxylic acid and salts, have been taught as polyolefin nucleating agents as well within Patent Cooperation Treaty Application WO 98/29494, to Minnesota Mining and Manufacturing. The best working example of this technology is embodied in disodium bicyclo[2.2.1]-5-heptene-2,3-dicarboxylate and formulations with such compounds.

Such compounds all impart relatively high polyolefin crystallization temperatures; however, each also exhibits its own drawback for large-scale industrial applications.

For example, of great interest is the compatibility of such compounds with different additives widely used within typical polyolefin (e.g., polypropylene, polyethylene, and the like) plastic articles. For instance, calcium stearate is a very popular acid neutralizer present within typical polypropylene formulations to protect the end product from catalyst residue attack. Unfortunately, most of the nucleator compounds noted above exhibit deleterious reactions with such compounds within polyolefin articles. For sodium, and other like metal ions, it appears that the calcium ion from the stearate transfers positions with the sodium ions of the nucleating agents, rendering the nucleating agents ineffective for their intended function. As a result, such compounds sometimes exhibit unwanted plate-out characteristics and overall reduced nucleation performance (as measured, for example) by a decrease in crystallization temperature during and after polyolefin processing. Other processing problems are evident with such compounds as well.

As noted above, beta-crystal polypropylene structures are preferably avoided, with at most 5% in terms of total numbers of polypropylene crystals in the final article preferred. Such beta-crystals do generally aid with impact resistance and stiffness of the target polypropylene article; however, in terms of clarity, the presence of above 5% is detrimental and such a small amount can cause high degrees of unwanted opacity in target transparent resin articles.

Other problems encountered with the standard nucleators noted above include inconsistent nucleation due to dispersion problems, resulting in stiffness and impact variation in the polyolefin article. Substantial uniformity in polyolefin production is highly desirable because it results in relatively uniform finished polyolefin articles. If the resultant article does not contain a well-dispersed nucleating agent, the entire article itself may suffer from a lack of rigidity and low impact strength. Thus, simplicity of production as well as effective dispersion of the initial components (reactants) within the target thermoplastic resin is needed, as well as effective nucleation thereby.

Furthermore, storage stability of nucleator compounds and compositions is another potential problem with thermoplastic nucleators and thus is of enormous importance as well. Since nucleator compounds are generally provided in powder or granular form to the polyolefin manufacturer, and since uniform small particles of nucleating agents is imperative to provide the requisite uniform dispersion and performance, such compounds must remain as small particles through storage. Certain nucleators, such as sodium benzoate, exhibit high degrees of hygroscopicity such that the powders made therefrom hydrate easily resulting in particulate agglomeration. Such agglomerated particles may require further milling or other processing for deagglomeration in order to achieve the desired uniform dispersion within the target thermoplastic. Furthermore, such unwanted agglomeration due to hydration may also cause feeding and/or handling problems for the user.

Also of great interest is the compatibility of such compounds with different additives widely used within typical polyolefin (e.g., polypropylene, polyethylene, and the like) plastic articles. As noted previously, calcium stearate compatibility is particularly important. Unfortunately, most of the nucleators compounds noted above (such as sodium benzoate, NA-11, disodium bicyclo[2.2.1] heptene dicarboxylate) exhibit much deleterious nucleating efficacy with such compounds within polyolefin articles. In order to avoid combinations of these standard nucleators and calcium salts, other nonionic acid neutralizers, such as dihydrotalcite (DHT4-A), would be necessary for use in conjunction with such nucleators. Such a combination, however, has proven problematic in certain circumstances due to worsened aesthetic characteristics (e.g., higher haze), and certainly higher costs in comparison with standard calcium salts.

Some nucleating agents, such as certain DBS derivatives, exhibit certain practical deficiencies such as a tendency to plate-out at high processing temperatures. DBS derivatives, particularly where the aromatic rings are mono-substituted, show much improved thermal stability. However, such compounds also tend to exhibit undesirable migratory properties coupled with problematic organoleptic deficiencies within certain polyolefin articles. As a result, such compounds are limited in their practical in some important areas, such as medical device packaging.

These noticeable problems have thus created a long-felt need in the polyolefin nucleator compound industry to provide such compounds that do not exhibit the aforementioned problems and provide excellent peak crystallization temperatures for the target polyolefin themselves. To date, the best compounds for this purpose remain those noted above. Unfortunately, nucleators exhibiting exceptionally high peak crystallization temperatures, low hygroscopicity, excellent thermal stability, and non-migratory properties within certain target polyolefin, and compatibility with most standard polyolefin additives (such as, most importantly, calcium stearate) have not been developed within the polyolefin nucleator industry.

Furthermore, methods of utilizing the benefits of typical salt additives within thermoplastics and polyolefins have heretofore been unexplored. In such a potential scenario, the ability to react added salts, such as acid scavengers, with nucleator precursor compounds could possibly provide, in situ, the desired type and amount of ultimate nucleating agent within the target thermoplastic resin. To date there has been no teaching of the viability of providing nucleation of thermoplastics (preferably polyolefins, more preferably polypropylene of very low beta-crystal levels) through the reaction of added bicyclic or monocycloaliphatic components (preferably, though not necessarily acids of such types) with added organic acids. Again, the closest art discloses either the production of high beta-crystal polypropylene levels, reactions between organic salts and bases, or the introduction of organic salts to already-present catalyst residues within target thermoplastics. Such an in situ reaction between added components could potentially reduce cost through supplying the needed metal ions from the already-present salts, as well as through simplification of the overall reaction itself through improved dispersion of the initially added compounds. Such a situation could be beneficial, for example, if the nucleator precursor exhibits better stability or other characteristic prior to introduction within target thermoplastic, as compared with the desired ultimate nucleating agent. However, again, no such teaching or fair suggestion has been presented within the pertinent prior art of this specific potential reaction.

OBJECTS OF THE INVENTION

Therefore, an object of the invention is to provide a thermoplastic (e.g., without limitation, polyolefin) nucleating agent that exhibits exceptional nucleation efficacy as indicated by exceptional high polymer peak crystallization temperatures which can be generated in situ within the target thermoplastics and exhibiting as low an amount of beta-crystal polypropylene structures as possible. A further object of the invention is to provide a simple method of nucleating thermoplastics utilizing a commonly added metal salt compound as a component to provide a metal ion needed for formation of the desired nucleating agent in reaction with an added compound soluble within the target molten thermoplastic resin, such as, as one non-limiting example, an acid (preferably, though not necessarily, a diacid). Yet another object of this invention is to provide nucleating and possibly clarifying compounds and compositions generated in situ as noted above that exhibit exceptional thermal stability and non-migratory properties. Yet another object of the invention is to provide such in situ generated nucleating compounds that provide excellent mechanical properties within the target thermoplastics. Additionally, it is an object of this invention to provide such in situ generated nucleating compounds or compositions that may be used in various polyolefin media for myriad end-uses.

Accordingly, this invention encompasses a method of nucleating a thermoplastic formulation comprising the steps of a) providing a molten thermoplastic formulation;

b) introducing, either simultaneously or separately, at least one bicyclic compound or monocycloaliphatic compound that exhibits substantial solubility within said formulation of step "a" and at least one organic salt (in order to generate, as one non-limiting example, a bicyclic monocycloaliphatic nucleating agent in situ); and c) allowing the resultant mixture in step "b" to cool to form a nucleated thermoplastic article; wherein the resultant thermoplastic comprises at most 5% in total parts of beta-crystals of polypropylene, and wherein said nucleated thermoplastic article exhibits a crystallization temperature in excess of that or the same thermoplastic free from any nucleating agents therein.

Preferably, without limitation, such an inventive method of nucleating a thermoplastic formulation comprising the steps of a) providing a molten thermoplastic formulation;

b) introducing, either simultaneously or separately, at least one compound conforming with either of formulae (I) or (II)

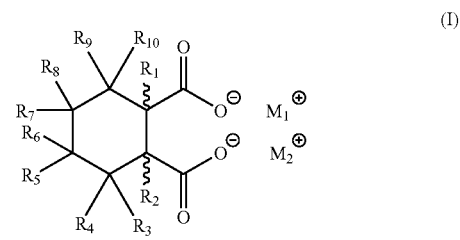

wherein wherein $R_1$, $R_2$, $R_3$, $R_4$, $R_5$, $R_6$, $R_7$, $R_8$, $R_9$, and $R_{10}$ are eithe the same or different and are individually selected from the group consisting of hydrogen, $C_1$–$C_9$ alkyl [wherein any two vicinal (neighboring) or geminal (same carbon) alkyl groups may be combined to form a carbocyclic ring of up to six carbon atoms], hydroxy, $C_1$–$C_9$ alkoxy, $C_1$–$C_9$ alkyleneoxy, amine, and $C_1$–$C_9$ alkylamine, halogens (fluorine, chlorine, bromine, and iodine), and phenyl, wherein geminal constituents may be the same except that such geminal constituents cannot simultaneously be hydroxy; and wherein geminal constituents may be different from each other, except that such geminal constituents may not be hydroxy and halogen or hydroxy and amine simultaneously (wherein the carboxylates may be cis or trans, with cis preferred for nucleation capabilities);

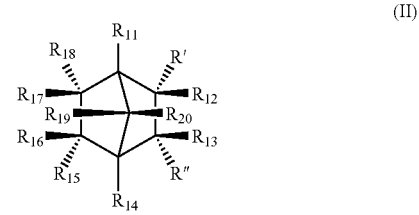

wherein $R_{11}$, $R_{12}$, $R_{13}$, $R_{14}$, $R_{15}$, $R_{16}$, $R_{17}$, $R_{18}$, $R_{19}$, and $R_{20}$ are individually selected from the group consisting of hydrogen, $C_1$–$C_9$ alkyl, hydroxy, $C_1$–$C_9$ alkoxy, $C_1$–$C_9$ alkyleneoxy, amine, and $C_1$–$C_9$ alkylamine, halogen, phenyl, alkylphenyl, and geminal or vicinal $C_1$–$C_9$ carbocyclic, wherein geminal constituents may be the same except that such geminal constituents cannot simultaneously be hydroxy; and wherein geminal constituents may be different from each other, except that such geminal constituents may not be hydroxy and halogen or hydroxy and amine simultaneously; wherein at least one of R' and R" is either C(O)—NR$_{21}$C(O) or C(O)O—R''', wherein $R_{21}$ is selected from the group consisting of $C_1$–$C_{30}$ alkyl, hydrogen, $C_1$–$C_{30}$ alkoxy, and $C_1$–$C_{30}$ polyoxyalkyl, and wherein if R' and R" are both C(O)O—R''', then at least one R''' for either R' or R" must be H, and at most one R''' for either R' or R" is a metal cation (such as monovalent metals sodium, potassium, and the like). Furthermore, for Formula II, in each of these potential compounds, the stereochemistry at the metal carboxylates may be cis or trans, although cis is preferred. In Formula II, the stereochemistry at the R' and R" groups may be cis-exo, cis-endo, or trans, although cis-endo is preferred.

The preferred embodiment polyolefin articles and additive compositions for polyolefin formulations comprising at least one of such compounds, broadly stated as saturated bicyclic carboxylic acids, are also encompassed within this invention.

The term "bicyclic" is intended to encompass compounds with at least two cyclic moieties that share at least 3 carbon atoms. This term may include unsaturated as well as saturated systems, although saturated types [such as in Formula (II)] are preferred.

The term "monocycloaliphatic" is intended to encompass compounds with a single saturated ring system therein. Non-limiting preferred examples of Formula (I) compounds include hexahydrophthalic acid and methyl-substituted hexahydrophthalic acid. Such compounds are saturated in nature and exhibit relatively high crystallization temperatures in thermoplastics, although to a less effective level than those preferred compounds conforming to Formula (II), above.

The term "organic salts" is intended to encompass any type of salt with an organic component therein and thus does not include metal halides (such as sodium chloride, aluminum chloride, potassium bromide, and the like). Such added organic salts must be able to thoroughly disperse within the target thermoplastic in order to effectuate proper dissociation between the cation portion (such as metal ions, ammonium ions, and the like) and the organic anion (such as, without limitation, and only as possible types, carboxylates, sulfonates, oxalates, phosphates, and the like). Furthermore, poly salts may be utilized as well [with either multiple metal ions present or multiple anions per a single metal ion, such as, again, without limitation, poly(sodium acrylate)]. As noted above, the solubility of such an organic salt, as well as its propensity to easily dissociate in order to contribute the necessary cation to displace the hydrogen on the acid compound while thoroughly dispersed within the target thermoplastic are of utmost necessity in this situation. The presence of highly oxidative halide anions is typically detrimental to the function of the desired thermoplastic and can discolor or actually deleteriously affect the stability and integrity of the finished thermoplastic, if not prevent achieving a finished thermoplastic at all. Thus, the presence of organic acids, including anions such as $C_8$–$C_{22}$ esters, are important to permit proper in situ nucleator generation and simultaneous ability to produce a desired and stable thermoplastic article. Additionally, some organic acids (calcium stearate, for example) are typically and commonly added to thermoplastics (polyolefins, for example) for acid scavenging purposes. Thus, such needed organic salts are compatible with such thermoplastics as well and should not deleteriously react with any additives present within the target molten resin or finished article. Preferred examples of such organic salts include, without limitation, calcium stearate, sodium stearate, lithium stearate, and the like.

The term "substantial solubility" is intended to encompass at least a degree of solubility such that upon introduction of an amount equal by weight to 1% of the target molten thermoplastic formulation, at a temperature of from 100–150° C., with a minimal amount of mixing (e.g., shear forces of at most - - - for - - - seconds), the majority of solid particles added thereto become nonvisible. Preferably, complete solubility is met by this definition, although a lesser degree of solubility to the level noted above, is acceptable as well.

Furthermore, other nucleating agents, such as those noted above as within the prior art, may also be present if desired to provide similar or different nucleation and/or clarifying capabilities within the target thermoplastic.

DETAILED DESCRIPTION OF THE INVENTION

As noted above, in order to develop a proper polyolefin nucleator compound or composition for industrial applications, a number of important criteria needed to be met. The inventive methods meet all of these important requirements very well in particular by producing in situ compounds that act as excellent nucleating agents through the reaction of the preferred, non-limiting, compounds of either Formula (I) or (II) with the cations provided by the organic salts (carboxylates, for example). Thus, as one example, the presence of sufficient amounts of calcium stearate with the bicyclic acids of Formula (II), produce calcium bicyclic salts which are excellent nucleating agents for target thermoplastics (sodium stearate thus produces disodium bicyclic salts, as another non-limiting example), preferably, though not necessarily, polyolefins, in particular, polypropylenes. Such bicyclic salts provide excellent high peak crystallization temperatures in a variety of polyolefin formulations, particularly within random copolymer polypropylene (hereinafter RCP) and homopolymer polypropylene (hereinafter HP). As a result, such inventive salts provide excellent mechanical properties for polyolefin articles without the need for extra fillers and rigidifying additives, and desirable processing characteristics such as improved (shorter) cycle time. Lastly, such inventive salts do not interact deleteriously with such organic salts, including common polypropylene additives such as calcium stearate.

Such properties of the preferred in situ generated saturated bicyclic nucleators are highly unexpected and unpredictable, particularly in view of the closest prior art, the WO 98/29494 reference discloses nucleation and clarification additives for polyolefin articles including unsaturated [2.2.1] dicarboxylate salts; however, there is no exemplification of a saturated dicarboxylate salt of this in situ-generated type as above. The closest embodiment within that art is identified as disodium bicyclo[2.2.1]-5-heptene-2,3-dicarboxylate; nothing remotely discusses the method of forming in situ saturated dicarboxylate bicyclic salts through the co-introducing of bicyclic diacids (or half-acids) with sufficient amounts of metal carboxylate salts to produce the saturated bicyclic salts needed to induce high nucleation rates. In comparison, at least very least, it has been determined that, quite unexpectedly, the hydrogenation of the aforementioned unsaturated bicyclic compounds provides vastly improved nucleation efficacy. For this invention, then, the ability to generate such saturated bicyclic salts is again heretofore been unknown and thus provides an unexpectedly efficacious nucleation capability. Furthermore, although unsaturated bicyclic compounds are taught by the reference above, there is no teaching or fair suggestion of the in situ generation of such compounds within target thermoplastics for nucleation purposes. As such, the ability to generate such compounds are thus encompassed within this invention as well, as the term "bicyclic" is not limited to the preferred saturated species.

As indicated in Experimental Table 1, below, the peak crystallization temperatures provided target polyolefin articles with these inventive saturated compounds are from about 2.5 to about 5° C. above that for the related unsaturated compounds. Such dramatic improvements are simply unexpected and are unpredictable from any known empirical or theoretical considerations. Furthermore, significant improvements in hygroscopicity of the saturated compounds were also unexpectedly observed. Such unpredictable improvements are of great practical significance as discussed before.

Furthermore, masterbatching operations have heretofore been extremely difficult, if not unavailable, for insoluble nucleation agents within thermoplastics due to dispersion problems and the consequential generation of unsightly and undesirable swirls within the target article. Furthermore, the amount of such insoluble nucleation agents has necessarily been very high due to a lack of efficiency of the desired insoluble nucleator in masterbatching methods; too much is unused or lost during the procedure to make it econically feasible. It has now been found that the inventive method may be practiced by including a thermoplastic-soluble acid component in a formulation separate from that of a thermoplastic-soluble organic salt component. Such formulations, which may be present as powders, pellets, or liquids, or one may be in one form and the other in any other form, should also comprise at least one polymer constituent as well. In this manner, for example, individual pellets of each formulation may be eventually combined within the target molten resin to provide desired nucleation characteristics. The results of such a masterbatching exercise have been quite unexpected because of the efficiency of the in situ generated nucleator and the high crystallization temperatures accorded the target thermoplastic while using appreciably low levels of reactant additives for such a purpose.

Yet another surprise was the improved compatibility between these acids as well as the generated preferred hexahydrophthalic acid salt and more preferred saturated bicyclic salt nucleating agents and typical acid scavenger salt compounds utilized within polyolefin formulations and articles, such as calcium and lithium stearate. Of course, as noted above, such stearates are preferable metal carboxylate salts that donate the needed metal ions to the acid compounds to form the desired bicyclic salts. However, once produced, the bicyclic salts exhibit compatibility with any excess acid scavengers remaining within the target resins as well. This property, coupled with the high peak crystallization temperatures available from the inventive compounds, thus provides a highly desirable thermoplastic nucleator compound that can be generated in situ unexpectedly and surprisingly.

The needed acids are thus added within the target polyolefin in an amount from about 50 ppm to about 20,000 ppm by weight in order to provide the aforementioned beneficial characteristics, most preferably from about 200 to about 10000 ppm. Higher levels, e.g., 5–50% or more by weight, may also be used in a masterbatch formulation. Optional additives within either the precursor formulations (such as pellets, liquids, powders, etc. of the acid), or the masterbatch formulations, or even within the final polyolefin article made therewith, may include plasticizers, antistatic agents, stabilizers, ultraviolet absorbers, and other similar standard polyolefin thermoplastic additives. Other additives may also be present within this composition, most notably plasticizers, acid scavengers, antimicrobials (preferably silver-based ion-exchange compounds, such as ALPHASAN® antimicrobials available from Milliken & Company), antioxidants, flame retardants, light stabilizers, antistatic agents, colorants, pigments, perfumes, chlorine scavengers, and the like.

The organic salts that donate the needed cations (metal ions, for example) to the acids are thus of any type that can also react with the dissociated hydrogens from the acids upon cation interaction and produce a very weak acid that does not interfere with the production of the desired thermoplastic itself (e.g., either is substantially inert and thus does not appreciably react with anything within the finished resin to any detrimental degree, or is easily removed through volatilization, blooming, or any other manner). Thus, broadly stated, the anion of the metal salt should exhibit a relatively high molecular weight and very low oxidation capability. Preferably, such metal salts are metal carboxylates, more preferably $C_8$–$C_{22}$ metal carboxylates. The metals are preferably Group I and Group II metals, although other metal species, such as any of the transition metals (silver, aluminum, and the like) may also be present. More preferably, such metal carboxylates are selected from the group consisting of calcium stearate, sodium stearate, and lithium stearate. Such salts should be added in an amount at least sufficient to impart the desired in situ generation of the necessary nucleating salt compound in tandem with the acid noted above. Also, for compounds such as calcium stearate and lithium stearate, as examples, the amount present may include that necessary to impart the simultaneous properties of acid scavenging within the target thermoplastic resin. Thus, from about 500 to about 15000 ppm are acceptable. More preferably, such a range is from about 750 to about 10000 ppm, most preferably between about 1000 and 5000 ppm.

The inventive additives thus form, in tandem with the required metal salts, nucleating agents that are salts themselves. Preferably, such in situ generated salts conform with the structure of Formula (III)

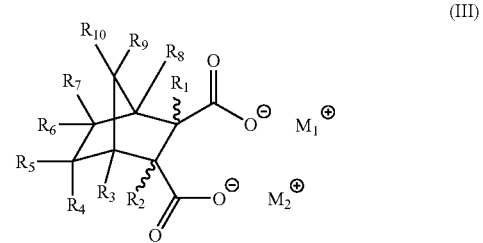

wherein M1 and M2 are either the same or different, or are combined to form a single metal atom, and are selected from the group consisting of metal and organic cations, and wherein $R_1$, $R_2$, $R_3$, $R_4$, $R_5$, $R_6$, $R_7$, $R_8$, $R_9$, and $R_{10}$ are individually selected from the group consisting of hydrogen, $C_1$–$C_9$ alkyl, hydroxy, $C_1$–$C_9$ alkoxy, $C_1$–$C_9$ alkyleneoxy, amine, $C_1$–$C_9$ alkylamine, halogen, phenyl, alkylphenyl, and geminal or vicinal $C_1$–$C_9$ carbocyclic; and a second formulation comprises at least one metal carboxylate salt. It is this generated compound that provides the most profound nucleation effects within the target thermoplastic, although some residual acid may also exhibit a certain degree of nucleation efficacy as well.

The term polyolefin or polyolefin resin is intended to encompass any materials comprised of at least one polyolefin compound. Preferred examples include isotactic and syndiotactic polypropylene, polyethylene, poly(4-methyl) pentene, polybutylene, and any blends or copolymers thereof, whether high or low density in composition. The polyolefin polymers of the present invention may include aliphatic polyolefins and copolymers made from at least one aliphatic olefin and one or more ethylenically unsaturated co-monomers. Generally, the co-monomers, if present, will be provided in a minor amount, e.g., about 10 percent or less or even about 5 percent or less, based upon the weight of the polyolefin (e.g. random copolymer polypropylene), but copolymers containing up to 25% or more of the co-monomer (e.g., impact copolymers) are also envisaged. Other polymers or rubber (such as EPDM or EPR) may also be compounded with the polyolefin to obtain the aforementioned characteristics. Such co-monomers may serve to assist in clarity improvement of the polyolefin, or they may function to improve other properties of the polymer. Other examples include acrylic acid and vinyl acetate, etc. Examples of olefin polymers whose transparency can be improved conveniently according to the present invention are polymers and copolymers of aliphatic monoolefins containing 2 to about 6 carbon atoms which have an average molecular weight of from about 10,000 to about 2,000,000, preferably from about 30,000 to about 300,000, such as, without limitation, polyethylene, linear low density polyethylene, isotactic polypropylene, syndiotactic polypropylene, crystalline ethylenepropylene copolymer, poly(1-butene), polymethylpentene, poly(1-hexene), poly(1-octene), and polyvinyl cyclohexane. The polyolefins of the present invention may be described as linear, regular polymers that may optionally contain side chains such as are found, for instance, in conventional low density polyethylene.

Although polyolefins are preferred, the nucleating agents of the present invention are not restricted to polyolefins, and may also give beneficial nucleation properties to polyesters such as polyethylene terephthalate (PET), polybutylene terephthalate (PBT), and polyethylene naphthalate (PEN), as well as polyamides such as Nylon 6, Nylon 6,6, and others. Generally, any thermoplastic composition having some crystalline content may be improved with the nucleating agents of the present invention.

The inventive method may also be practiced through the introduction of an additive composition comprising both the needed acid and metal salt components within a molten target thermoplastic resin and allowing the resin to cool into a desired article (through molding, extrusion, and the like). Such additive compositions may be present in any standard additive form, including, without limitation, powder, prill, agglomerate, liquid suspension, and the like, particularly comprising dispersion aids such as polyolefin (e.g., polyethylene) waxes, stearate esters of glycerin, montan waxes, mineral oil, and the like. Basically, any form may be exhibited by such a combination or composition including such combination made from blending, agglomeration, compaction, and/or extrusion.

The composition may then be processed and fabricated by any number of different techniques, including, without limitation, injection molding, injection blow molding, injection stretch blow molding, injection rotational molding, extrusion, extrusion blow molding, sheet extrusion, film extrusion, cast film extrusion, foam extrusion, thermoforming (such as into films, blown-films, biaxially oriented films), thin wall injection molding, and the like into a fabricated article.

Preferred Embodiments of the Invention

This invention can be further elucidated through the following examples where examples of particularly preferred embodiment within the scope of the present invention are presented.

Production of Inventive Additive Compositions

The preferred additive compositions were produced in accordance with the following table (formulations 5 and 6 were separate made for masterbatching):

TABLE 1

Acid/Salt Combinations and Amounts Added

| Ex. # | Acid (ppm) | Salt (ppm) |
|---|---|---|
| 1 | bicyclo[2.2.1]heptane-2,3-dicarboxylic acid (1800 ppm) | CaStearate (6600 ppm) |
| 2 | same | NaStearate (6700 ppm) |
| 3 | same | LiStearate (6400 ppm) |
| 4 | same | ZnStearate (7000 ppm) |
| 5 | same (but at 83000 ppm) | — |
| 6 | — | CaStearate (273200 ppm) |
| 7 | hexahydrophthalic acid (2500 ppm) | LiStearate (1000 ppm) |
| 8 | same | CaStearate (1000 ppm) |
| 9 | endo-norbornene-2,3-dicarboxylic acid (1000 ppm) | NaStearate (3400 ppm) |

Each example formulation was pelletized with a polypropylene homopolymer or random copolymer (for examples 7 and 8) for further introduction within the target thermoplastics (polypropylenes) as noted below. These samples were then compared with commercial samples of Millad® 3988, sodium benzoate, NA-11, and NA-21, as well as already prepared unsaturated bicyclic compounds.

Nucleation Efficacy Test:

Thermoplastic compositions (plaques) were produced comprising the additives from the Examples above and sample homopolymer polypropylene (HP) resin plaques or sample random copolymer polypropylene (RCP) resin plaques, produced dry blended, extruded through a single screw extruder at 400–450° F., and subsequently pelletized. Accordingly, one kilogram batches of target polypropylene were produced in accordance with the following tables:

| HOMOPOLYMER POLYPROPYLENE COMPOSITION TABLE 1 | |
|---|---|
| Component | Amount |
| Polypropylene homopolymer (Himont Profax ® 6501) | 1000 g |
| Irganox ® 1010, Primary Antioxidant (from Ciba) | 500 ppm |
| Irgafos ® 168, Secondary Antioxidant (from Ciba) | 1000 ppm |
| Inventive Nucleator (from Table I) | as noted |

| HOMOPOLYMER POLYPROPYLENE COMPOSITION TABLE 2 | |
|---|---|
| Component | Amount |
| Polypropylene homopolymer (Himont Profax ® 6301) | 1000 g |
| Irganox ® 1010, Primary Antioxidant (from Ciba) | 500 ppm |
| Irgafos ® 168, Secondary Antioxidant (from Ciba) | 1000 ppm |
| Inventive Nucleator (from Table I) | as noted |

| RANDOM COPOLYMER POLYPROPYLENE COMPOSITION TABLE | |
| --- | --- |
| Component | Amount |
| Polypropylene random copolymer flake (3% ethylene) | 1,000 g |
| Irganox ® 1010, Primary Antioxidant (from Ciba) | 500 ppm |
| Irgafos ® 168, Secondary Antioxidant (from Ciba) | 1000 ppm |
| Inventive Nucleator (from Table I) | as noted |

The base HP or RCP and all additives were weighed and then blended in a Papenmeier (Welex) mixer for 1 minute at about 1600 rpm. All samples were then melt compounded on a Killion single screw extruder at a ramped temperature from about 204° to 232° C. through four heating zones. The melt temperature upon exit of the extruder die was about 246° C. The screw had a diameter of 2.54 cm and a length/diameter ratio of 24:1. Plaques of formulations 1–4 and 7–9, from above, were then made through extrusion into an Arburg 25 ton injection molder. The molder was set at a temperature anywhere between 190 and 260° C., with a range of 190 to 240° C. preferred, most preferably from about 200 to 230° C. The plaques had dimensions of about 51 mm×76 mm×1.27 mm, and the mold had a mirror finish which was transferred to the individual plaques. The mold cooling circulating water was controlled at a temperature of about 25° C. Formulations 5 and 6 (masterbatch) were directly let down at the appropriate ratio (preferably, 40:1 of concentrate to base resin pellets) into the molder for manufacture of the test piece as described above.

Testing for nucleating effects and other important criteria were accomplished through the formation of plaques of clarified polypropylene thermoplastic resin. These plaques were formed through the process outlined above with the specific compositions listed above in Table 1.

These plaque formulations are, of course, merely preferred embodiments of the inventive article and method and are not intended to limit the scope of this invention. The resultant plaques were then tested for peak crystallization temperatures (by Differential Scanning Calorimetry). Crystallization is important in order to determine the time needed to form a solid article from the molten polyolefin composition. Generally, a polyolefin such as polypropylene has a crystallization temperature of about 110° C. at a cooling rate of 20° C./min. In order to reduce the amount of time needed to form the final product, as well as to provide the most effective nucleation for the polyolefin, the best nucleator compound added will invariably also provide the highest crystallization temperature for the final polyolefin product. The nucleation composition efficacy, particular polymer peak crystallization temperature ($T_c$), was evaluated by using DSC according to ASTM D-794-85 with a modified cooling rate of 20° C./minute. To measure these temperatures, the specific polypropylene composition was heated from 60° C. to 220° C. at a rate of 20° C. per minute to produce a molten formulation and held at the peak temperature for 2 minutes. At that time, the temperature was then lowered at a rate of 20° C. per minute until it reached the starting temperature of 60° C. The crystallization temperature was thus measured as the peak maximum during the crystallization exotherm. The clarification performance of the nucleators was measured using ASTM D 1003-92.

The following Table lists the peak crystallization temperatures for the plaques prepared above:

EXPERIMENTAL TABLE 1
Performance of Additives Nucleator
Precursors in Polypropylene Homopolymer

| Additives | Final Additive Conc. (ppm) | Polym. Cryst. Temp | % Haze |
| --- | --- | --- | --- |
| Ex. 1 | 2300 | 125.7 | 21% |
| Ex. 2 | 2300 | 123.7 | 35% |
| Ex. 3 | 2300 | 119.7 | 37% |
| Ex. 4 | 2300 | 121.4 | 39% |
| Exs. 5 and 6 (Masterbatch) | 5000 | 125.1 | 33% |
| Ex. 7 | 2500 | 113.5 | 28% |
| Ex. 8 | 2500 | 111.9 | 28% |
| Ex. 9 | 4400 | 116.3 | 71% |
| None | — | 110 | 68% |
| Disodium bicyclo[2.2.1]heptene dicarboxylate | 1000 | 122 | 50% |
| Disodium bicyclo[2.2.1]heptene dicarboxylate | 2500 | 123 | 46% |
| DMDBS | 2500 | 123 | 11% |
| NA-11 | 1000 | 124 | 32% |
| NA-21 | 2500 | 123 | 20% |

When introduced within the target resins, the inventive example formulations easily dissolved therein such that no solids were detectable visibly with the naked eye. Thus, the added compounds, being solids originally, were substantially soluble within the target resins.

The data show that the inventive additives at least exhibit acceptable crystallization temperatures, and at most, better crystallization temperatures than the comparative typical nucleating agents (and, in some cases, lower haze measurements as well)(Formulation 4 is tested within the Homopolymer Polypropylene Composition 2, from above, while the remaining tests for Examples 1–3, and 5–6, as well as the comparative data were undertaken within Homopolymer Polypropylene Composition 1; Examples 7–9 were present within RCP).

Each resultant inventive polypropylene was then analyzed for beta-crystal presence. The beta-PP (crystal) content was evaluated by using a Perkin-Elmer DSC7 (although an equivalent type of DSC could be used as well). To measure % beta-PP, the specific polypropylene composition was heated from 60° C. to 220° C. at a rate of 20° C. per minute in order to completely melt the polymer. When PP is analyzed under these conditions, alpha-PP crystals melt with a melting peak temperature of about 165° C., while beta-PP crystals melt with a melting peak temperature much less than 165° C., typically 148° C. The absence of lower melting peak at about 148° C. indicates a beta-PP (crystal) content of less than 5%. When a separate peak having a melting peak temperature of about 148° C. is identified, the beta content can be quantified. The % beta-PP can then be determined by dividing the heat of fusion of the beta-PP peak by the heat of fusion of all of the PP crystals in the sample (the total heat of fusion of the polymer). In actuality, the heat of fusion of beta-PP crystals is slightly lower than the heat of fusion of alpha-PP crystals. Thus, the test noted above is simplified to a certain extent such that a reading of 6% beta-PP crystals may actually be calculated to be 5%. For the inventive resins discussed and exemplified above, however, there were no melting peak temperatures indicating beta-PP crystal presence (at about 148° C.). Thus, no detection of such beta-PP structures was measured (and thus they all exhibited less than 5% beta-PP crystals).

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. A method of forming a polypropylene article comprising the steps of:
   a) providing a molten isotactic polypropylene formulation,
   b) introducing at least one soluble salt compound into said molten isotactic polypropylene formulation, said soluble salt compound being selected from the group consisting of: bicyclic compounds and monocycloaliphatic compounds,
   c) introducing a soluble organic salt into said molten isotactic polypropylene formulation, wherein said soluble organic salt comprises a $C_8$–$C_{22}$ metal carboxylate;
   d) reacting said soluble salt compound with said soluble organic salt to form in situ an insoluble bicyclic dicarboxylate salt nucleating agent that is well dispersed and capable of providing substantial nucleation benefits to said molten isotactic polypropylene formulation;
   e) cooling said molten isotactic polypropylene formulation, and
   f) forming a polypropylene article.

2. The method of claim 1 wherein said polypropylene comprises a homopolymer.

3. The method of claim 1, wherein said soluble salt compound of step (b) comprises a compound conforming with formula (I)

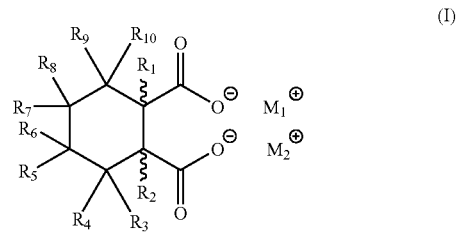

(I)

wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$–$C_9$ alkyl, hydroxy, $C_1$–$C_9$ alkoxy, $C_1$–$C_9$ alkyleneoxy, amine, $C_1$–$C_9$ alkylamine, halogens, and phenyls; and wherein $M_1$ and $M_2$ are metal ions.

* * * * *